Sept. 4, 1956 H. A. WILLIAMS 2,761,544
APPARATUS FOR CONVEYING ARTICLES
Filed July 31, 1952
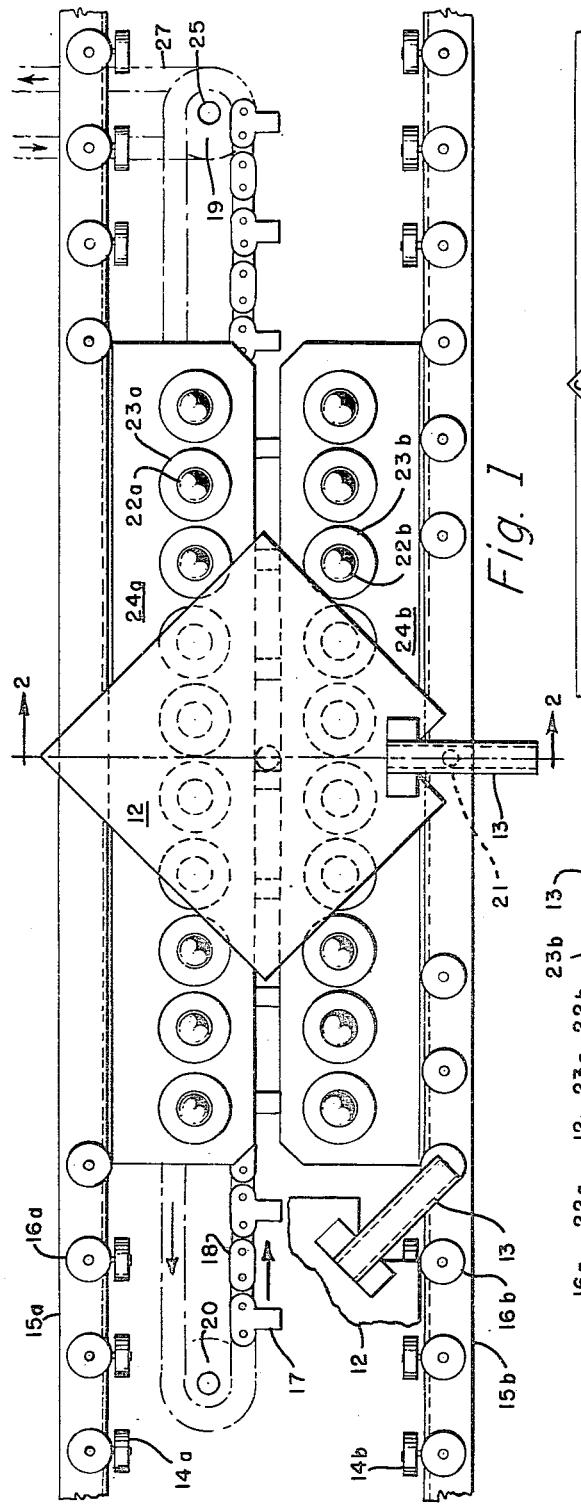
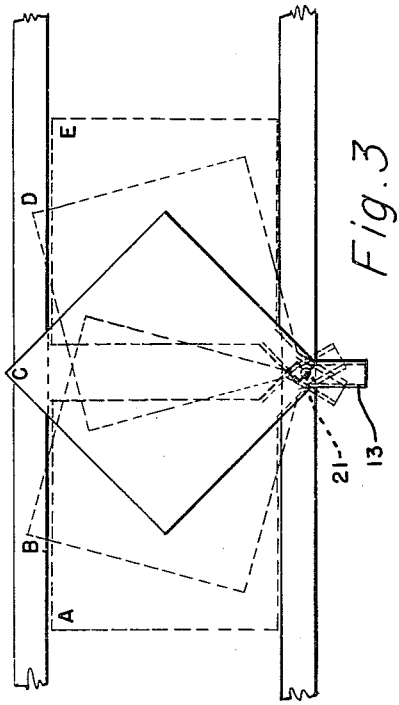
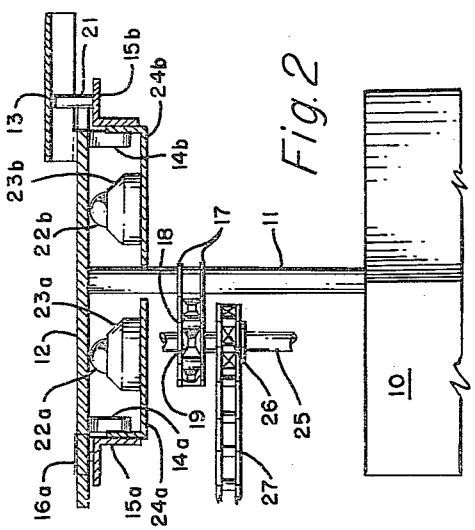
INVENTOR.
HERSCHEL A. WILLIAMS
BY
Attorney

United States Patent Office 2,761,544
Patented Sept. 4, 1956

2,761,544

APPARATUS FOR CONVEYING ARTICLES

Herschel A. Williams, Indianapolis, Ind., assignor to Ransburg Electro-Coating Corp., Indianapolis, Ind., a corporation of Indiana Application July 31, 1952, Serial No. 301,932

6 Claims. (Cl. 198—33)

This invention relates to apparatus for conveying articles along a predetermined path and is particularly directed to the indexing of articles on a moving conveyor system.

The step-by-step processing of many articles of manufacture dictates the use of conveying apparatus to transport articles in seriatim along a predetermined path for successive processing at a number of stations. Very often it is desired to index the articles, i. e., to rotate them through a certain arc or angle, at a particular station so as to present the articles in a different or turned position at subsequent processing stations. The spray coating of rectangular articles traveling on a conveyor, for example, may be readily accomplished by exposure of the two outwardly facing sides to sprays of coating material from sources positioned on opposite sides of the conveyor, then successively indexing the articles 90°, and then exposing the remaining two sides of each article to a second series of oppositely disposed spray sources. Since conveyor systems must be fully automatic and able to reproduce identical results time after time and day after day, indexing should be accomplished simply, without appreciable swinging, swaying or other inter-article movement, and positively without regard for such variable factors as friction or the exact position or rate of articles being presented for indexing.

It is an object of my invention to provide novel apparatus for indexing articles moving in succession along a predetermined path. A further object of the invention is to provide simple and positive means for rotating an article support which has a horizontally extending member and which is freely movable on a conveyor track. Still a further object of my invention is to provide a sway-inhibiting conveyor apparatus for the movement and indexing of articles in seriatim. Yet another object of my invention is to provide for the economical handling of articles being carried on a series of article supports without substantial inter-article movement.

My invention provides for the propelling and indexing of a series of separate, integral article supporting structures carrying articles in seriatim along a predetermined path. A propelling means separate from the supporting structures is used and the indexing is accomplished by temporary engagement of a portion of the article supporting structure with a lug positioned along the article path. While in its broad aspects my invention is not dependent upon any specific means of propelling the article to be indexed, it is particularly adapted to a system wherein the article mounted on a freely movable, sway-inhibiting supporting structure is pushed along a staitonary track. Such pusher mechanism may be either the primary or an auxiliary means of conveying the articles along the main conveyor track. Thus, my invention may, by itself, form a complete conveyor system or serve as an adjunct to an existing system.

The foregoing objects and features of my invention will be fully understood from the following description with reference to the attached drawings wherein:

Fig. 1 is a plan view of one embodiment of my invention;

Fig. 2 is an end elevational view, partially in cross section, taken along line 2—2 of Fig. 1; and Fig. 3 is a diagrammatic illustration of the indexing of an article supporting structure such as shown in Figs. 1 and 2.

Referring to Figs. 1 and 2, articles 10 being processed are carried by a hanger 11 which is rigidly affixed at its upper end to the under face of a square horizontal plate 12. At one corner of the upper face of plate 12 is fixed an outwardly extending indexing arm 13 shown as a length of channel iron. Plate 12 is supported on two parallel series of horizontal axis idler rollers 14a and 14b for movement along the major portion of the predetermined path of article travel. Rollers 14a and 14b are rotatably mounted on horizontal axes on two conveyor tracks 15a and 15b respectively. Two series of vertical-axis idler rollers 16a and 16b, rotatably mounted on tracks 15a and 15b respectively, guide plate 12 along the conveyor track so that the plate is freely movable along rollers 14a and 14b and between rollers 16a and 16b. It has been found that the use in a conveyor of an article supporting structure embodying a wide horizontally extending member such as plate 12 will substantially reduce undesirable swing, sway and other inter-article movement of the articles carried on the conveyor.

The article supporting structures (hangers 11 and plates 12) are propelled along the conveyor track by a series of identical pushers 17, which engage the rearmost surface of hangers 11. Each pusher 17 is firmly fixed to one link of conveyor chain 18 and the pushers are uniformly spaced along the entire length of the chain. Chain 18 is mounted on driving sprocket 19 and idler sprocket 20 located generally beneath tracks 15a and 15b in a plane parallel to the plane of plate 12. The sprockets are positioned so that chain 18 moves between idler sprocket 20 and drive sprocket 19 parallel to the movement of the article supporting structure and so that pusher 17 will engage hanger 11.

Lug 21, rigidly mounted on track 15b, is positioned so that indexing arm 13 will strike lug 21 as the article supporting structure enters an indexing zone wherein the desired turning of the article is accomplished. In the indexing zone, plate 12 is no longer supported upon idler rollers 14a and 14b, nor is it guided between rollers 16a and 16b. Instead, the plate moves in an arc about the axis of hanger 11 on two rows of freely rolling balls 22a and 22b, mounted respectively in two rows of brackets 23a and 23b, which furnish the supporting means for plate 12. The rollers 16b continue into the indexing zone somewhat further than rollers 16a in the embodiment shown in order to provide a guide for plate 12 until arm 13 has substantially engaged lug 21. The guiding of the article supporting structure through the indexing zone is accomplished by two guide plates 24a and 24b, which are mounted in a plane parallel to and beneath plate 12. These plates are spaced equally from and along the center line of the conveyor and closely adjacent to the outer surface of hanger 11, so that the opposing edges of plates 24a and 24b will form a slot parallel to adjacent chain 18 and within which hanger 11 must move throughout the indexing zone.

The two rows of brackets 23a and 23b are mounted on the upper face of plates 24a and 24b respectively, and at such height that plate 12 will slide smoothly and uninterruptedly from rollers 14a and 14b onto the two rows of balls 22a and 22b. Chain 18 is driven at a constant rate of speed by driving sprocket 19, which is mounted on shaft 25 which in turn is mounted vertically from a suitable support (not shown). Sprocket 26 is also mounted on shaft 25 concentrically with driving sprocket 19 and sprocket 26 is driven by chain 27 from a suitable source of power (not shown) so as to rotate driving sprocket 19.

In the operation of the conveyor system, articles 10 will be supported on a series of article supporting structures. As pusher 17 moves into engagement with hanger 11 of each article supporting structure, the movement of conveyor chain 18 will propel the article supporting structure along its predetermined path on rollers 14a and 14b. As plate 12 of the article supporting structure enters the indexing zone, indexing arm 13 will engage lug 21. Throughout its travel through the indexing zone, hanger 11, propelled by pusher 17 traveling at a constant speed, will move with uninterrupted linear velocity along the conveyor path in the slot formed by the opposing edges of guide plates 24a and 24b. However, plate 12 will be prevented by the contact between arm 13 and lug 21 from continuing in its former orientation relative to the conveyor path. Thus the constant forward motion of pusher 17 will be transmitted to plate 12 through hanger 11 so as to cause plate 12 to rotate or index about hanger 11. As previously mentioned, throughout the indexing zone plate 12 will be supported upon two rows of balls 22a and 22b to facilitate the indexing of the plate.

Referring now to Fig. 3, there are shown five successive steps, lettered A through E, assumed successively by plate 12 and indexing arm 13 as the article supporting structure is indexed about hanger 11. It is apparent that as plate 12 rotates about hanger 11 from position A to position B and successively to position E, arm 13 will be "slipping" along the face of lug 21. Lug 21 is so positioned in the embodiment herein described that as plate 12 is rotated through an arc of 90° about hanger 11 and, propelled forwardly by pusher 17, reaches position E, arm 13 will have been drawn in toward the center line of the conveyor track so that it will no longer engage lug 21. Thereupon, the article supporting structure will be free to resume normal travel in its indexed position along the remainder of the conveyor track. As arm 13 withdraws from contact with lug 21, plate 12 again moves onto two series of stationary horizontal-axis rollers 14a and 14b and will be guided between vertical-axis rollers 16a and 16b as shown.

It will be noted that various arcs of rotation of the article can be attained by varying the distance between lug 21 and plate 12 and by other adjustments familiar to those skilled in the art. It is further noted that while the preferred embodiment herein described and shown utilizes a chain with a series of lugs as the propelling means for moving the articles along the predetermined path, other means of movement may be employed so long as a smooth and uninterrupted movement is imparted to each integral, separate article supporting structure prior, during and subsequent to indexing.

In order to reorient the article supporting structure upon the conveyor track so that arm 13 will be forward of plate 12 to engage lug 21 the next time it travels through the indexing zone, a device for rotating the article supporting structure to its original position may be employed at a point on the track remote from the indexing zone or such reorientation may be performed manually either in conjunction with or separate from the operation of removing the articles from the conveyor system.

While this invention is susceptible of embodiments in many different forms, there has been shown in the drawings and described in detail a convenient embodiment with the understanding that the same is to be considered as an exemplification of the principles of my invention and is not intended to limit the invention to the embodiment shown. The true scope of the invention is pointed out in the appended claims.

I claim:

1. An article indexing apparatus comprising a horizontal indexing plate, an article hanger extending downwardly from said plate, a plurality of balls for supporting said plate, a driven pusher for propelling said plate on said balls along a predetermined path, and a lug for temporarily obstructing the forward motion of one portion of said plate positioned to cause the plate as it moves along said path to pivot 90° in relation to said lug.

2. In an apparatus for conveying an article along a predetermined path, indexing mechanism comprising an article supporting structure comprising an article hanger mounted on a horizontally positioned plate having an extended arm, said plate being movably supported on a plurality of anti-friction devices, a pusher for propelling said article supporting structure along said path on said anti-friction devices, and a lug positioned along said path to temporarily engage said extended arm.

3. In an article conveying system for moving an article along a path, article supporting means including a square horizontal plate with an article hanger depending from its center, and indexing mechanism including a stationary lug for engaging a corner of said plate to rotate said plate about its center through a predetermined angle at a predetermined point on said path.

4. An article indexing apparatus comprising a horizontal indexing plate, an article support extending vertically from the approximate center of said plate, a plurality of anti-friction devices extending generally in two spaced apart parallel rows for supporting said plate, means for propelling said plate on said anti-friction devices along a predetermined path, and a lug positioned along said path to temporarily obstruct a portion of said plate and to pivot said plate on said anti-friction devices about said article support as the plate moves along said path.

5. In an apparatus for conveying an article along a predetermined path, indexing mechanism comprising an article supporting structure having a horizontal plate and an article hanger vertically mounted on said plate, a conveyor track, a plurality of anti-friction devices arranged along said conveyor track, means for propelling said article supporting structure on said anti-friction devices, guiding means extending parallel to said track and lying along side the path of travel of said article hanger to prevent movement of said article hanger transverse to said track, and means for pivoting said article supporting structure on said anti-friction devices about the vertical axis of the article hanger as said article supporting structure moves along said track and movement of said article hanger transverse to said track is prevented by said guiding means.

6. An article indexing apparatus comprising a horizontal plate, an article support extending vertically from the approximate center of said plate, a plurality of anti-friction devices extending generally in two spaced apart parallel rows for supporting said plate, a conveyor track for supporting said anti-friction devices, a pair of parallel guiding members lying along said track on either side of said article support to prevent movement thereof transverse to said track, means for propelling said plate on said anti-friction devices along said track with the article support between said guiding members, and means for pivoting said plate and article support in a predetermined arc about the vertical axis of said article support as said plate and article support move along said track with movement of the article support transverse to said track being prevented by said guiding members.

References Cited in the file of this patent

UNITED STATES PATENTS

| | | |
|---|---|---|
| 1,493,346 | Kmentt | May 6, 1924 |
| 1,876,066 | Logan | Sept. 6, 1932 |
| 2,546,374 | Rayburn | Mar. 27, 1951 |
| 2,618,207 | Hery | Nov. 18, 1952 |
| 2,619,916 | Rainier | Dec. 2, 1952 |

FOREIGN PATENTS

| | | |
|---|---|---|
| 479,675 | Germany | July 20, 1929 |
| 530,676 | Great Britain | Dec. 17, 1940 |